United States Patent [19]

Babel et al.

[11] Patent Number: 4,831,714

[45] Date of Patent: May 23, 1989

[54] TOOL CHANGING DEVICE FOR PROGRAM-CONTROLLED UNIVERSAL MILLING AND DRILLING MACHINES

[75] Inventors: Werner Babel, Pfronten-Meilingen; Gerd Hoppe, Habichtswald, both of Fed. Rep. of Germany

[73] Assignee: MAHO Aktiengesellschaft, Pfronten, Fed. Rep. of Germany

[21] Appl. No.: 106,722

[22] Filed: Oct. 8, 1987

[30] Foreign Application Priority Data

Oct. 27, 1986 [DE] Fed. Rep. of Germany ....... 3636498

[51] Int. Cl.⁴ ............................................. B23Q 3/157
[52] U.S. Cl. ....................................................... 29/568
[58] Field of Search ............... 29/568, 26 A; 414/736, 414/744 A

[56] References Cited

U.S. PATENT DOCUMENTS

| | | | |
|---|---|---|---|
| 3,816,904 | 6/1974 | Herb | 29/568 |
| 4,012,830 | 3/1977 | Ewertowski | 29/568 |
| 4,344,220 | 8/1982 | Sachot | 29/568 |
| 4,372,728 | 2/1983 | Murakami | 29/568 |
| 4,575,918 | 3/1986 | Mattson | 29/568 |
| 4,670,965 | 6/1987 | Sato et al. | 29/568 |
| 4,713,875 | 12/1987 | Dormehl | 29/568 |

FOREIGN PATENT DOCUMENTS

| | | | |
|---|---|---|---|
| 3440604 | 5/1986 | Fed. Rep. of Germany | 29/568 |
| 54044 | 3/1982 | Japan | 29/568 |

*Primary Examiner*—William Briggs
*Attorney, Agent, or Firm*—Baker, Maxham, Jester & Meador

[57] ABSTRACT

A tool changing device for program-controlled universal milling and drilling machines as well as machining centers. The device comprises at least one gripper movable in plural axes between a tool magazine and the horizontal and vertical work spindles respectively. The gripper is secured to a program-controlled motor-driven support and transfers the tools from the transfer position of the tool magazine to the horizontal or vertical work spindle. In accordance with the disclosure a bracket is mounted on a cross member secured to a sidewall of the machine frame, the bracket being axially movable and pivotable within predetermined limit positions. A bent or cranked support is mounted on the free end of the bracket for rotation therewith and carries a 90°-rotatable cross-arm including the gripper.

26 Claims, 5 Drawing Sheets

TOOL CHANGING DEVICE FOR PROGRAM-CONTROLLED UNIVERSAL MILLING AND DRILLING MACHINES

FIELD OF THE INVENTION

This invention is directed in general to a tool changing device for program-controlled universal milling and drilling machines and more specifically to a device for selectively transferring tools from the transfer position of the tool magazine to the horizontal or the vertical work spindle, and vice versa.

BACKGROUND OF THE INVENTION

Tool changing systems for program-controlled universal milling machines and machining centers, as they are called, are already known in various configurations. Normally, these comprise one or several grippers by means of which the tools are removed from the magazine, which is typically disposed in the rear portion of the machine, transported in front of the respective work spindle and automatically loaded therein. The dimensions and the arrangement of the tool magazine relative to the two spindle axes requires complex three-dimensional movements of the grippers and of their supporting structure composed of a multiplicity of individual components, which movements can only be performed by a correspondingly large number of discrete drive mechanisms. This applies especially to tool changing devices of the type in which the horizontal and the vertical work spindles are selectively loaded. The relatively large number of separately movable components in such devices renders the control complex and results, in addition to high manufacturing costs, in a considerable space requirement in the immediate vicinity of the machine tool. Moreover, reliability and tool changing times are usually unsatisfactory with such complex changing systems.

SUMMARY OF THE INVENTION

It is an object of the present invention to provide a tool changing device for program-controlled universal milling and drilling machines, machining centers or the like, which is of relatively simple design and is composed of but a relatively small number of movable parts in a single mechanism. The mechanism can selectively load and unload the horizontal and vertical work spindles from and to a single magazine in a reliable and rapid way.

In accordance with the invention the above object is satisfied in that a bracket is mounted on a cross member secured to a sidewall of the machine frame, the bracket being axially movable and pivotable within predetermined limits. The bracket has a bent or cranked support mounted thereon for rotation therewith carrying a 90°-rotatable cross-arm including the gripper.

The bracket which is mounted on the cross member fixed to the frame simultaneously executes a displacement in the axis of the cross member and a pivoting movement about the axis under the action of a linear drive mechanism, for instance a hydraulic cylinder disposed in the hollow cylindrical cross member. Due to these two simultaneously executed combined motions the gripper is moved in one operation directly in front of the changing position of the magazine or, respectively, in front of the work spindle to be loaded, which takes place within a short period of time lasting but a few seconds. Guiding of the bracket on the cross member by means of a sleeve or bushing ensures a reliable and accurate positioning of the bracket in either of its extreme positions which may be determined, for instance, by fixed limit stops. The components of the tool changing device according to the invention can be manufactured economically and require but little fine finishing. Moreover, due to the rearwardly bent or cranked configuration of the support only relatively little free space is required for the motions in the immediate vicinity of the machine.

In modern universal milling machines and machining centers the working space is limited at the rear by partition walls in order to protect the movable machine parts and especially the tools in the magazine from contamination by chips and cooling oil. In accordance with an especially advantageous embodiment of the invention a part of the protective wall is configured as a hinged cover which is opened and closed upon each tool changing operation by means of a correspondingly designed linkage mechanism in conjunction with the gripper support.

BRIEF DESCRIPTION OF THE DRAWING

The objects advantages and features of the invention will be more readily appreciated from the following detailed description, when read in conjunction with the accompanying drawing, in which.

DESCRIPTION OF THE PREFERRED EMBODIMENT

Figure 1:
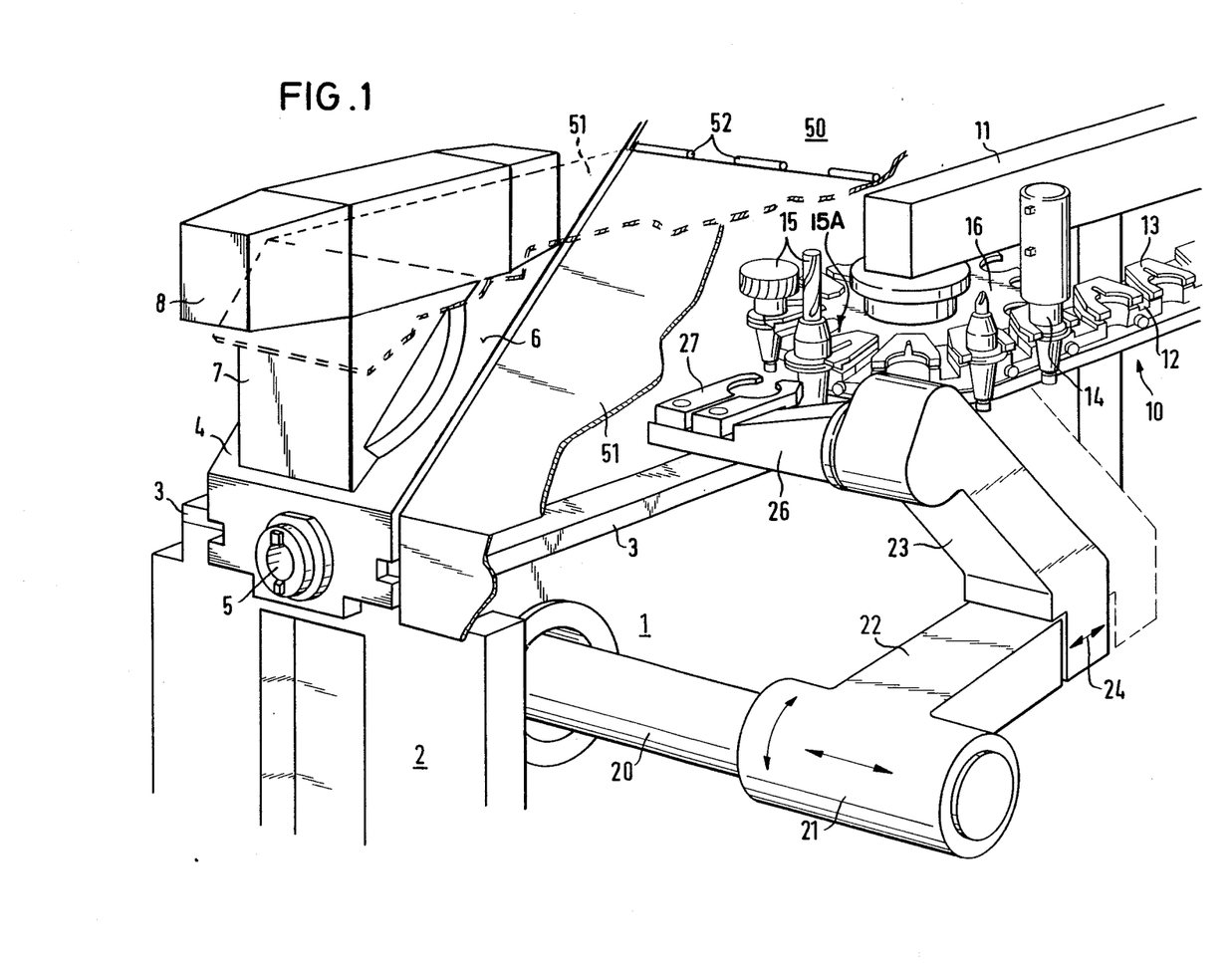
FIG. 1 is a perspective view of the tool changing device of the invention attached to a universal milling machine in a condition immediately prior to removal of a tool from the magazine.
Figure 3:
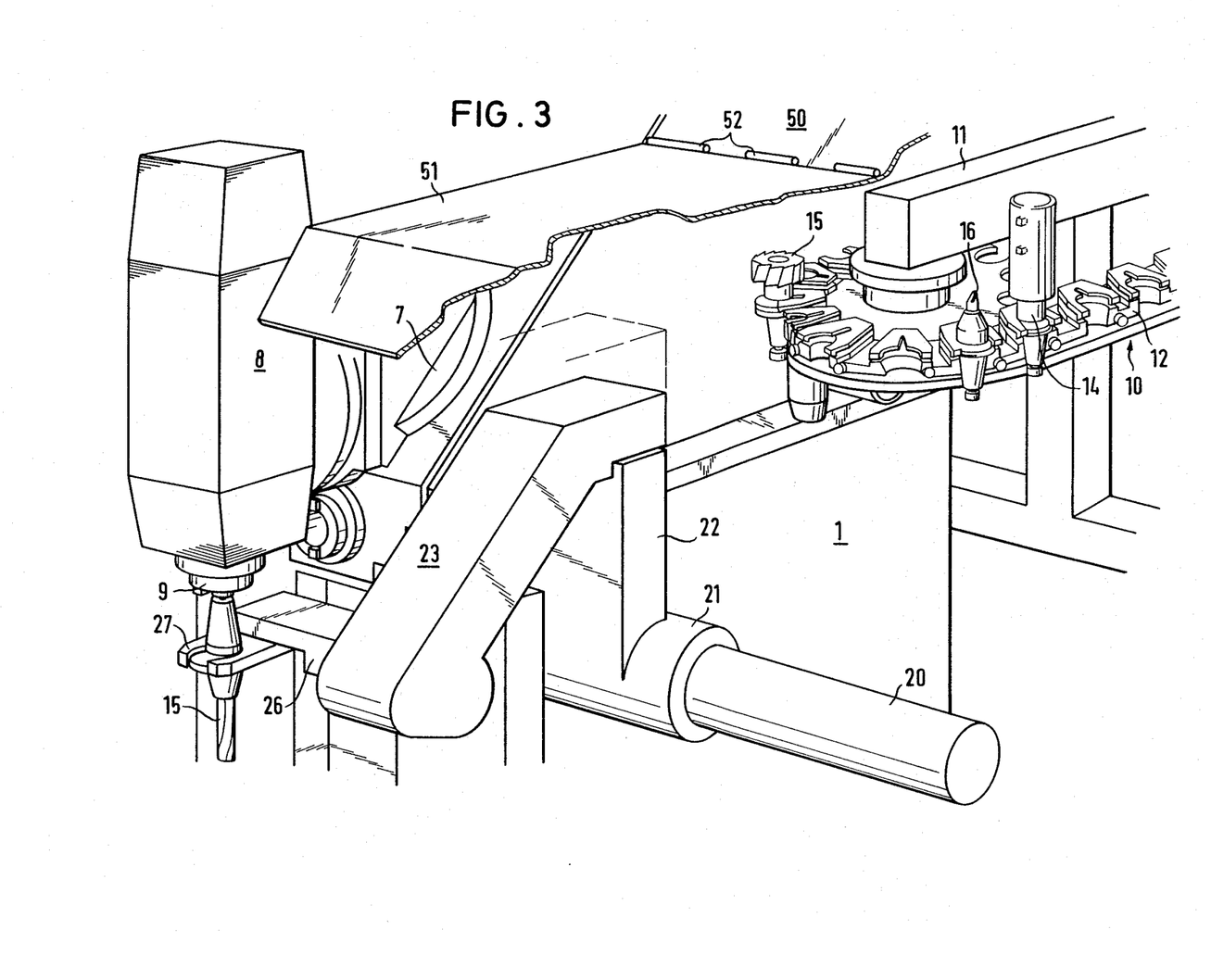
FIG. 3 shows the tool changing device of FIG. 1 immediately prior to a tool being loaded in the vertical spindle.

With reference now to the drawing, and more specifically to FIG. 1 thereof, the illustrated universal milling machine comprises frame 1 with forward vertical guide means 2 for a column (not illustrated) and upper guide means 3 on which headstock 4 is longitudinally guided. The lower portion of the headstock accommodates horizontal work spindle 5. On inclined end surface 6 swivelling head 7 is mounted for rotation and locking about a 45°-axis (not illustrated), the forward end face of the swivelling head having vertical head 8 with vertical work spindle 9 mounted thereon (FIG. 3).

At the side of headstock 4 chain magazine 10 is disposed on robust supporting frame 11, link chain 12 of the magazine including tool holders 13. Each gripper-like tool holder has a tool taper 14 seated therein and has a downwardly extending cone and upwardly extending tool 15. Link chain 12 is trained about chain wheels 16 of which at least one is a driven wheel for moving tools 15 sequentially to the foremost changing position in accordance with the respective machining program. The tool which is located in the changing position is indicated in FIG. 1 by reference numeral 15A.

In the forward portion of frame 1 hollow cylindrical cross member 20 is fixedly mounted and has solid sleeve 21 mounted thereon for movement in the longitudinal direction of the cross member and for rotation about the axis thereof. The sleeve is fixedly joined to solid bracket 22, the bracket having a rectangular cross-section. The forward end of the bracket has cranked, rearwardly bent as shown in FIG. 1, support 23 mounted thereon. Support 23 is translatable in the direction of arrows 24 of FIG. 1 to the dashed-line position by means of hydraulic cylinder 25 (FIGS. 2 and 4) integrated in bracket 22. The free end of rigid support 23 is enlarged and carries cross-arm 26 on the side facing the headstock. The distal end of the cross-arm has gripper 27 transversely mounted thereon so that, in the position of FIG. 1, the longitudinal axis of the gripper extends in parallel to the headstock axis and through the vertical central axis of tool 15 which is in the changing position.

Figure 5:
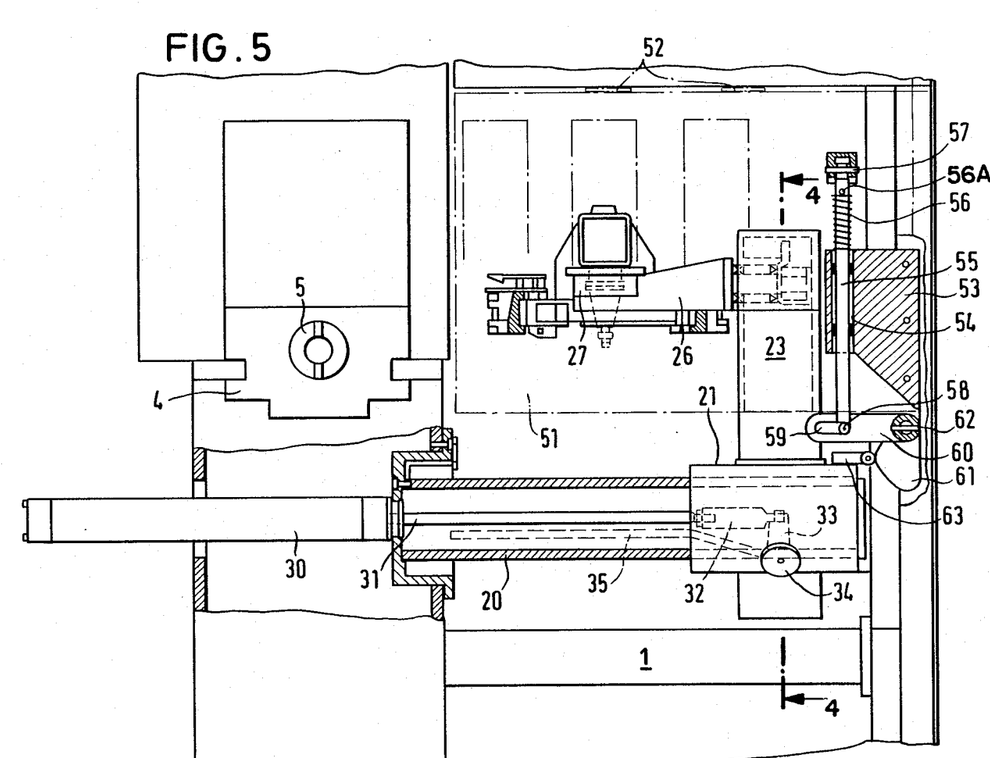
FIG. 5 is a front view and, respectively, a partially sectional view, of the universal milling machine and the tool changing device of the invention.

With reference to FIG. 5, frame 1 has hydraulic cylinder 30 mounted thereto on the axis of cross member 20 with piston rod 31 extending axially within the cross member. At the distal end of the piston rod is cross-pin 33 secured by means of adapter 32. The cross-pin extends through curved-path opening or slot 35 formed in cross member 20 and has its free end secured to sleeve 21 of bracket 22 by means of nut 34. Hydraulic cylinder 30 is connected by fittings (not illustrated) to hydraulic lines so that its working chambers on either side of the piston can alternatingly be supplied with hydraulic fluid. In this way piston rod 31 may be retracted and extended with a predetermined force, wherein sleeve 21 connected to cross-pin 33 executes a rotary movement of, for example, 90°, corresponding to the configuration of curved path 35 as it, at the same time, executes a longitudinal displacement. To this end adapter 32 is rotatably secured to piston rod 31. To reduce friction, cross-pin 33 may be provided with a roller for riding along helical curved path 35.

Figure 4:
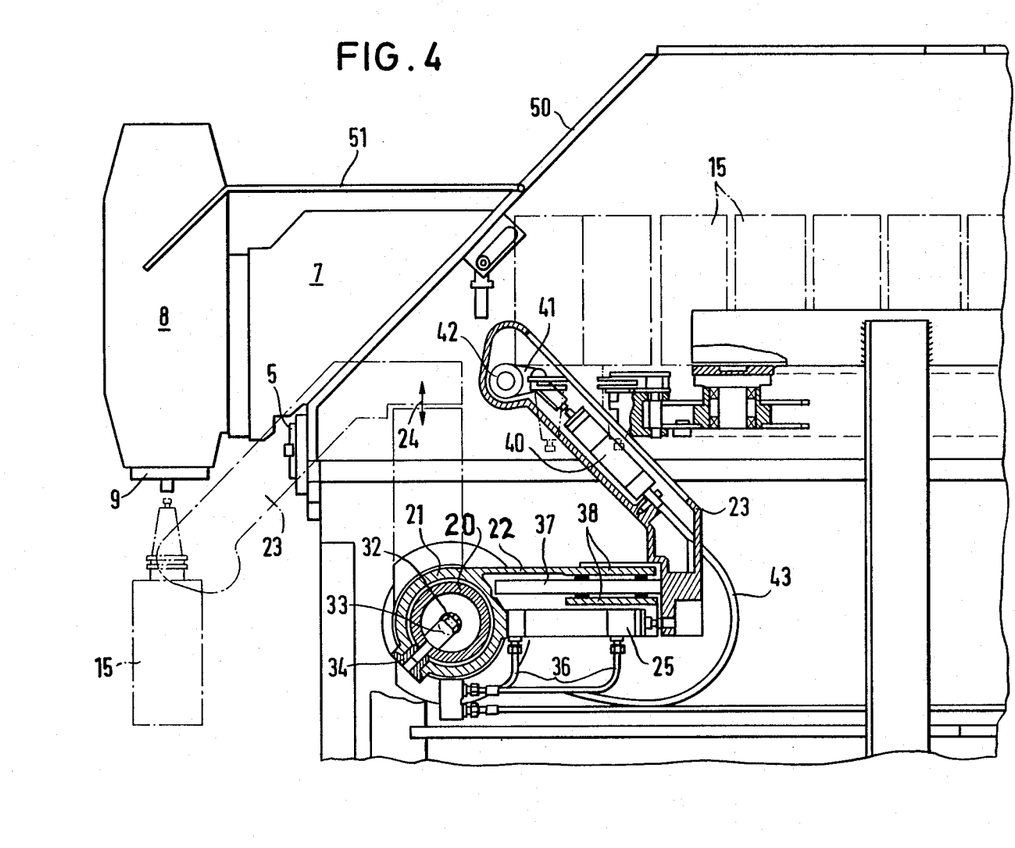
FIG. 4 is a side view of the upper part of a universal milling machine with a sectional view of the chain magazine taken along cutting plane 4—4 of FIG. 5.

As will be apparent from FIG. 4, the lower portion of bracket 22, which is integral with sleeve 21, has disposed therein hydraulic cylinder 25 with fittings 36 for the supply and discharge of hydraulic fluid. The piston rod of hydraulic cylinder 25 engages the lower portion of rearwardly bent support 23. Moreover, the lower support portion has guide rod 37 secured thereon which is longitudinally guided in guide sleeve 38, for instance, by means of sliding bearings in bracket 22. Due to the fixed arrangement of hydraulic cylinder 25 in bracket 22 and to guide rod 37, support 23 is moved in the direction of the double-arrow 24 of FIG. 1 without any undesirable play.

In the upper bent portion of support 23 further hydraulic cylinder 40 is mounted, the piston rod of which is pivotally connected to crank 41. Crank 41 is fixedly connected to end sleeve 42 of cross-arm 26 so that due to the retraction or extension of the piston rod of hydraulic cylinder 40 cross-arm 26 together with gripper 27 is rotated about its longitudinal axis. Hydraulic cylinder 40 is supplied with hydraulic fluid through flexible hose 43.

As illustrated, chain magazine 10 disposed sideways of the headstock is protected from the working space by partition wall 50 which has cover 51 pivotable about horizontal hinges 52 provided therein. Hinged cover 51 is moved from its closing position to the elevated position (dashed lines in FIG. 1), and back, by a linkage mechanism illustrated in the right-hand portion of FIG. 5, which is actuated by the axial displacement of sleeve 21. On the sidewall of the protective cabin or of a stand, respectively, console 53 is secured which has recess 54 in which connecting rod 55 is guided for longitudinal movement. Compression spring 56 is anchored intermediate the surface of console 53 and counter-retaining means 56A on the connecting rod. The upper end of connecting rod 55 is secured by link 57 to the inner surface of hinged cover 51. The lower end of the connecting rod is provided with cross-pin 58 which may be provided with a roller, the cross-pin being accommodated in elongated slot 59 of pivot arm 60. The pivot arm is connected to cam 61 for rotation therewith and is rotatable about pin 62 mounted on the stand of the protective cabin. Pressure pad 63 is mounted on sleeve 21 and has its roller riding along the curved contour of cam 61 to pivot the same together with pivot arm 60.

Operation of the above tool changing device will now be described. For a change of tools in the horizontal spindle according to FIGS. 1 and 2 it is assumed that the tool changing device has the position illustrated in FIG. 1 and that vertical milling head 8 is pivoted to the illustrated inoperative position. By actuating hydraulic cylinder 25, support 23 is translated in the direction of arrow 24 to the dashed-line position of FIG. 1 so that gripper 27, which has been moved to the right, grips the tool holder of tool 15 located in changing position 15A of magazine 10. By returning support 23 in response to a counter-acting supply of fluid pressure to hydraulic cylinder 25 the tool taper is pulled from the magazine holder. When a spring pressure-operated gripper is used, no further auxiliary means are required for this operation. The gripper may also comprise power-operated driving means which ensure a sufficiently wide opening and a closing movement, the actuation of which is executed by the program control of the machine.

Figure 2:
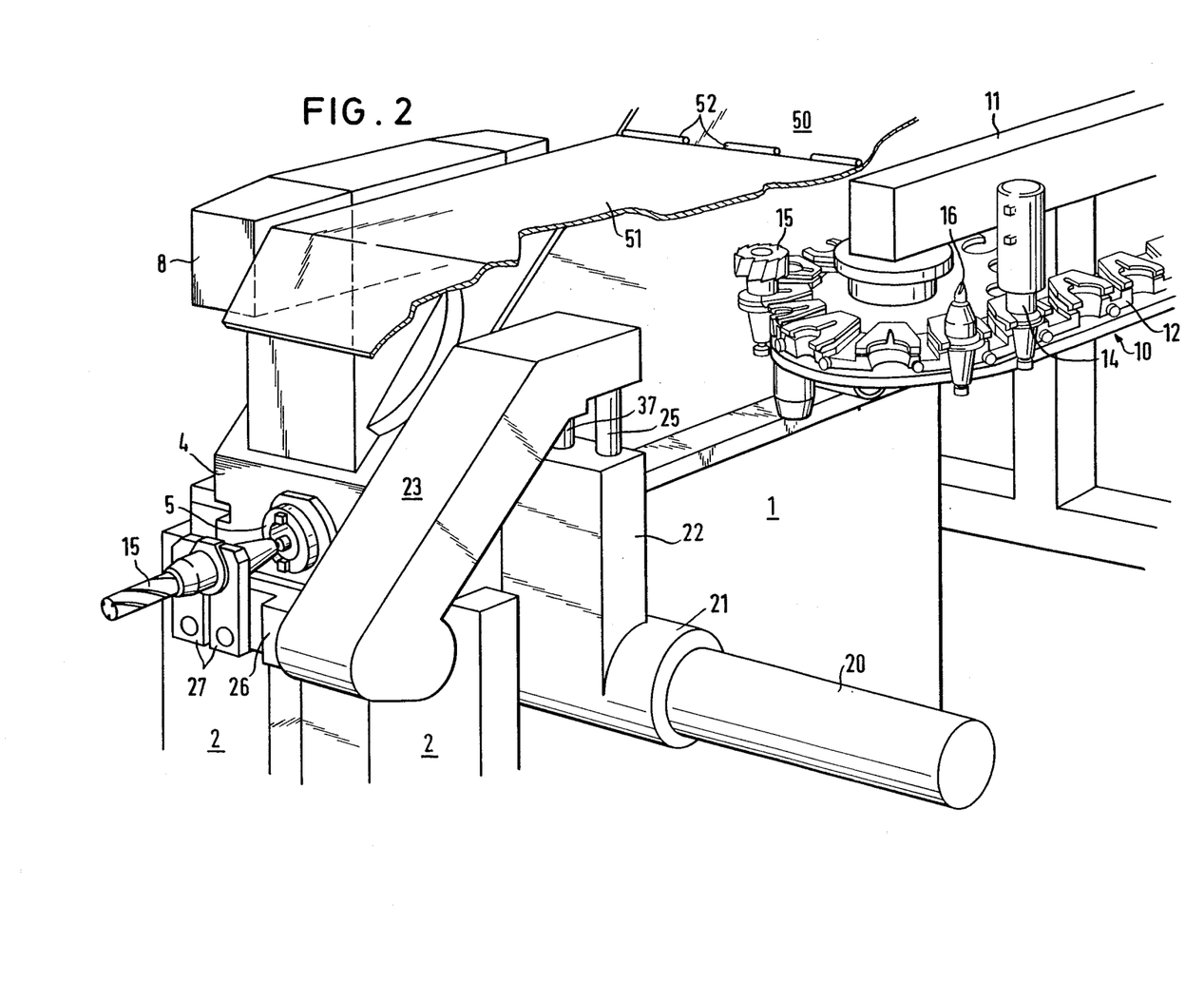
FIG. 2 shows the tool changing device of FIG. 1 immediately prior to a tool being loaded in the horizontal spindle.

When support 23 has been returned to the position shown in FIG. 1, piston rod 31 is retracted into hydraulic cylinder 30 so that sleeve 21 is axially displaced on cross member 20 while at the same time the sleeve with bracket 22 and support 23 is rotated about 90° to the position illustrated in FIG. 2. At the start of the displacing motion of sleeve 21 pressure pad 63 (FIG. 5) secured thereto will also be driven along, and due to the action of spring 56 connecting rod 55 is lifted and pivot arm 60 together with tripping cam 61 are rotated to an upper position. This movement of the connecting rod causes the timely opening of hinged cover 51 to the elevated position illustrated in FIG. 2. After completion of the rotary and displacing movement of sleeve 21 on cross member 20 tool 15 with the inwardly facing tool taper will be in front of the end face of headstock 4, which is returned to its initial position, but is still beneath the spindle axis. By renewed actuation of hydraulic cylinder 25 support 23 is extended to the illustrated upper position, the stroke of actuating cylinder 25 being designed such that the axis of tool 15 and of the tool taper coincide with the longitudinal axis of work spindle 5. Thereupon the tool taper is pushed into the tool receiving opening of the work spindle by forward movement of headstock 4 and actuation of the spindle chuck. By retracting hydraulic cylinder 25 support 23 with cross-arm 26 is lowered and gripper 27 is pulled off the tool holder. Due to renewed application of hydraulic fluid to hydraulic cylinder 30 the tool changing device is returned to the initial position illustrated in FIG. 1 while simultaneously cam 61 is actuated and hinged cover 51 is closed. When a tool is to be removed from horizontal work spindle 5 and is transferred to an empty space of tool magazine 10, the afore-described operations are performed in reverse order.

The changing steps for loading vertical work spindle 9 according to FIG. 3 largely correspond to the above described steps, but during the rotary and displacing movement of sleeve 21 on cross member 20 transverse support 26 is rotated about its longitudinal axis by actuation of hydraulic cylinder 40, so that after completion of the displacing and rotating motions of sleeve 21 the tool will have the vertical position shown in FIG. 3. By hydraulic fluid supply to hydraulic cylinder 25 support 23 is elevated relative to now vertical support 22 to the dashed-line position of FIG. 3, whereby the tool taper is pushed into the receiving opening of the vertical spindle. Upon actuation of the spindle chuck the gripper is opened either by spring action or by built-in drive means to such an extent that after forward movement of headstock 4 by a small lateral distance it will be released from clamped tool 15 due to the displacing movement of sleeve 21 on cross member 20. In further extension of the displacing movement of sleeve 21 the same will be rotated and thus bracket 22 will be pivoted to the initial position of FIG. 1. At the same time cross-arm 26 with gripper 27 will be turned back to the stand-by position shown in FIG. 1 due to controlled actuation of hydraulic cylinder 40.

All of the afore-described operations are executed automatically in accordance with the machining program stored in the control unit (not shown).

The invention is not limited to the described embodiment thereof. In particular, shape and position of members 22, 23, 26, for example, may be chosen in a different suitable way. The same applies to the drive mechanisms, which may also be designed as different linear drive means.

What is claimed is:

1. A tool changing device for program-controlled universal milling and drilling machines having a frame, vertical and horizontal work spindles, and a tool magazine having a transfer position, said device comprising:
   program-controlled tool transport means for selectively transferring tools between the tool magazine and the vertical and horizontal work spindles, said tool transport means comprising:
   an elongated cross member mounted to said frame, said cross member having a longitudinal axis;
   bracket means mounted to said cross member for limited axial and pivotable movement with respect thereto, said bracket means extending laterally from said cross member;
   support means having a proximal end mounted to said bracket means and extending generally laterally therefrom, said support means being movable axially and pivotably with said bracket means;
   an elongated cross-arm having a proximal end rotatably mounted to the distal end of said support means, said cross-arm having a longitudinal axis and a distal end;
   means connected to said distal end and extending generally at a right angle relative to said longitudinal axis for gripping tools for changing purposes.

2. A tool changing device for program-controlled universal milling and drilling machines having a frame, vertical and horizontal work spindles, and a tool magazine having a transfer position, said device comprising:
   program-controlled tool transport means for selectively transferring tools between the tool magazine and the vertical and horizontal work spindles, said tool transport means comprising:
   an elongated cross member mounted to said frame, said cross member having a longitudinal axis;
   bracket means mounted to said cross member for limited axial and pivotable movement with respect thereto, said bracket means extending laterally from said cross member, said bracket means comprising an elongated bracket fixed to a sleeve;
   support means having a proximal end mounted to said bracket means and extending generally laterally therefrom, said support means being movable axially and pivotably with said bracket means, said support means comprising:
     a cranked support transversely mounted to said bracket; and
     linear drive means coupling said cranked support to one end of said bracket for transverse movement of said cranked support with respect to said bracket, said linear drive means being disposed in axially parallel relationship with respect to said bracket;
   an elongated cross-arm having a proximal end rotatably mounted to the distal end of said support means, said cross-arm having a longitudinal axis, the distal end of said cross-arm being arranged to extend at substantially a right angle with respect to said cross-arm axis; and
   means at said distal end for gripping tools for changing purposes.

3. A tool changing device for program-controlled universal milling and drilling machines having a frame, vertical and horizontal work spindles, and a tool magazine having a transfer position, said device comprising:
   program-controlled tool transport means for selectively transferring tools between the tool magazine and the vertical and horizontal work spindles, said tool transport means comprising:
   an elongated cross member mounted to said frame, said cross member having a longitudinal axis;
   bracket means mounted to said cross member for limited axial and pivotable movement with respect thereto, said bracket means extending laterally from said cross member, said bracket means comprising an elongated bracket fixed to a sleeve;
   said cross member comprising a wall formed with a hollow cylinder extending therefrom, said sleeve being disposed on said cylinder for rotation and axial movement thereon;
   linear drive means in said cylinder for providing the axial movement;
   rotational guide means coupling said sleeve to said linear drive means for providing the rotational movement of said sleeve;
   support means having a proximal end mounted to said bracket means and extending generally laterally therefrom, said support means being movable axially and pivotably with said bracket means;
   an elongated cross-arm having a proximal end rotatably mounted to the distal end of said support means, said cross-arm having a longitudinal axis, the distal end of said cross-arm being arranged to extend at substantially a right angle with respect to said cross-arm axis; and means at said distal end for gripping tools for changing purposes.

4. The device recited in claim 1, wherein:
said bracket means comprises an elongated bracket fixed to a sleeve;
said cross member comprises a wall formed with a hollow cylinder, said sleeve being disposed on said cylinder for rotation and axial movement;
linear drive means in said cylinder for providing the axial movement; and
rotational guide means coupling said sleeve to said linear drive means for providing the rotational movement of said sleeve.

5. The device recited in claim 3, wherein:
said cylinder is formed with a helical groove in said wall;
said rotational guide means comprises a guide pin extending from said linear drive means through said helical groove and connected to said sleeve.

6. The device recited in claim 3, wherein said linear drive means comprises a hydraulic cylinder and a piston rod, said guide pin being secured to said piston rod.

7. The device recited in claim 1, wherein:
said bracket means comprises an elongated bracket fixed to a sleeve;
said support means comprises:
a cranked support transversely mounted to said bracket;
linear drive means coupling said cranked support to one end of said bracket for transverse movement of said cranked support with respect to said bracket, said linear drive means being disposed in axially parallel relationship with respect to said bracket.

8. The device recited in claim 3, wherein:
said support means comprises:
a cranked support transversely mounted to said bracket;
linear drive means coupling said cranked support to one end of said bracket for transverse movement of said cranked support with respect to said bracket, said linear drive means being disposed in axially parallel relationship with respect to said bracket.

9. The device recited in claim 5, wherein:
said support means comprises:
a cranked support transversely mounted to said bracket;
linear drive means coupling said cranked support to one end of said bracket for transverse movement of said cranked support with respect to said bracket, said linear drive means being disposed in axially parallel relationship with respect to said bracket.

10. The device recited in claim 6, wherein:
said support means comprises:
a cranked support transversely mounted to said bracket;
linear drive means coupling said cranked support to one end of said bracket for transverse movement of said cranked support with respect to said bracket, said linear drive means being disposed in axially parallel relationship with respect to said bracket.

11. The device recited in claim 1, wherein said tool transport means further comprises means for rotating said cross-arm.

12. The device recited in claim 11, wherein said rotating means comprises:
a hydraulic cylinder in said support means, said hydraulic cylinder having a piston rod; and
a crank coupled between said piston rod and said rotatable cross-arm.

13. The device recited in claim 3, wherein said tool transport means further comprises means for rotating said cross arm.

14. The device recited in claim 13, wherein said rotating means comprises:
a hydraulic cylinder in said support means, said hydraulic cylinder having a piston rod; and
a crank coupled between said piston rod and said rotatable cross arm.

15. The device recited in claim 5, wherein said tool transport means further comprises means for rotating said cross arm.

16. The device recited in claim 15, wherein said rotating means comprises:
a hydraulic cylinder in said support means, said hydraulic cylinder having a piston rod; and
a crank coupled between said piston rod and said rotatable cross arm.

17. The device recited in claim 2, wherein said tool transport means further comprises means for rotating said cross arm.

18. The device recited in claim 17, wherein said rotating means comprises:
a hydraulic cylinder in said support means, said hydraulic cylinder having a piston rod; and
a crank coupled between said piston rod and said rotatable cross arm.

19. The device recited in claim 1, and further comprising:
a hinged protective cover between the work space adjacent the tools on said vertical and horizontal work spindles on the one hand, and said tool magazine and said tool transport means on the other hand, said protective cover having an open and a closed position; and
linkage means coupling said bracket means and said protective cover, whereupon axial motion of said bracket means moves said protective cover between the open and the closed positions.

20. The device recited in claim 3, and further comprising:
a hinged protective cover between the work space adjacent the tools on said vertical and horizontal work spindles on the one hand, and said tool magazine and said tool transport means on the other hand, said protective cover having an open and a closed position; and
linkage means coupling said sleeve and said protective cover, whereupon axial motion of said sleeve moves said protective cover between the open and the closed positions.

21. The device recited in claim 5, and further comprising:
a hinged protective cover between the work space adjacent the tools on said vertical and horizontal work spindles on the one hand, and said tool magazine and said tool transport means on the other hand, said protective cover having an open and a closed position; and
linkage means coupling said sleeve and said protective cover, whereupon axial motion of said sleeve moves said protective cover between the open and the closed positions.

22. The device recited in claim 2, and further comprising:
a hinged protective cover between the work space adjacent the tools on said vertical and horizontal work spindles on the one hand, and said tool magazine and said tool transport means on the other hand, said protective cover having an open and a closed position; and
linkage means coupling said sleeve and said protective cover, whereupon axial motion of said sleeve moves said protective cover between the open and the closed positions.

23. The device recited in claim 1, wherein said means for gripping comprises a gripper rotatable with said cross-arm about said cross-arm axis, said gripper being adapted to grasp and release a tool for changing and transporting tools in the machines.

24. The device recited in claim 23, wherein pursuant to said program-control said gripper selectively moves into position and grasps a tool in the transfer position of said tool magazine and, by means of the axial and pivotable movement of said bracket means and said support means transfers the tool to one of said vertical and horizontal work spindles, and moves into position and grasps a tool in one of said vertical and horizontal work spindles and, by means of the axial and pivotable movement of said bracket means and said support means, transfers it to the transfer position of said tool magazine.

25. A tool changing device for program-controlled universal milling and drilling machines having a frame, vertical and horizontal work spindles, and a tool magazine having a transfer position, said device comprising:
program-controlled tool transport means for selectively transferring tools between the tool magazine and the vertical and horizontal work spindles, said tool transport means comprising:
an elongated cross member mounted to said frame, said cross member having a longitudinal axis;
bracket means mounted to said cross member for limited axial and pivotable movement with respect thereto, said bracket means extending laterally from said cross member;
support means having a proximal end mounted to said bracket means and extending generally laterally therefrom, said bracket means being movable axially and pivotably with said bracket means;
an elongated cross-arm having a proximal end rotatably mounted to the distal end of said support means, said cross-arm having a longitudinal axis, the distal end of said cross-arm being arranged to extend at substantially a right angle with respect to said cross-arm axis;
means at said distal end for gripping tools for changing purposes;
a hinged protective cover between the work space adjacent the tools on said vertical and horizontal work spindles on the one hand, and said tool magazine and said tool transport means on the other hand, said protective cover having an open and a closed position; and
linkage means coupling said bracket means and said protective cover, whereupon axial motion of said bracket means moves said protective cover between the open and the closed positions.

26. The device recited in claim 1, wherein:
said support means, being mounted to said bracket means for translational movement along the direction said bracket means, which direction extends laterally from said cross member, for moving said means for gripping selectively toward and away from said tool magazine and selectively toward and away from said vertical and horizontal work spindles when aligned therewith by means of the movement of said bracket means, support means and cross-arm in relation to said cross member.

* * * * *